US007878702B2

(12) United States Patent
Peng

(10) Patent No.: US 7,878,702 B2
(45) Date of Patent: Feb. 1, 2011

(54) BABY FOOD MAKER

(76) Inventor: Zheng Peng, 4694 Sycamore Dr., Ypsilanti, MI (US) 48197

( * ) Notice: Subject to any disclaimer, the term of this patent is extended or adjusted under 35 U.S.C. 154(b) by 946 days.

(21) Appl. No.: 11/742,511

(22) Filed: Apr. 30, 2007

(65) Prior Publication Data
US 2008/0264270 A1 Oct. 30, 2008

(51) Int. Cl.
*A47J 43/046* (2006.01)
(52) U.S. Cl. ............... 366/145; 366/146; 366/205; 366/314
(58) Field of Classification Search ......... 366/144–146, 366/197–207, 314, 331; 99/348, 453; 220/304; 241/282.1–282.2
See application file for complete search history.

(56) References Cited

U.S. PATENT DOCUMENTS

| 2,282,866 | A | * | 5/1942 | Hagen | 366/205 |
|---|---|---|---|---|---|
| 2,585,255 | A | * | 2/1952 | Kochner et al. | 241/282.2 |
| 2,758,623 | A | * | 8/1956 | Malz et al. | 241/199.12 |
| 2,897,862 | A | * | 8/1959 | Malz et al. | 241/199.12 |
| 2,940,738 | A | * | 6/1960 | Posener et al. | 366/205 |
| 2,992,715 | A | * | 7/1961 | Blachly | 192/69.71 |
| 3,603,364 | A | * | 9/1971 | Samuelian et al. | 241/199.12 |
| 3,610,762 | A | * | 10/1971 | Dugan | 241/101.3 |
| 3,881,705 | A | * | 5/1975 | Greenspan | 241/282.2 |
| 3,887,169 | A | * | 6/1975 | Maynard | 366/307 |
| 4,149,271 | A | * | 4/1979 | Uibel et al. | 366/314 |
| 5,797,313 | A | * | 8/1998 | Rothley | 99/483 |
| 5,970,847 | A | * | 10/1999 | Saltzman | 99/287 |
| 6,065,861 | A | | 5/2000 | Chen | |
| 6,283,625 | B2 | * | 9/2001 | Frankel et al. | 366/146 |
| 6,318,247 | B1 | * | 11/2001 | Di Nunzio et al. | 99/348 |
| 7,371,004 | B1 | * | 5/2008 | Branson et al. | 366/130 |
| 7,780,337 | B2 | * | 8/2010 | Peng | 366/144 |
| 2006/0286255 | A1 | | 12/2006 | Xu et al. | |
| 2009/0260523 | A1 | * | 10/2009 | Peng | 99/348 |

FOREIGN PATENT DOCUMENTS

EP 1647217 A1 * 4/2006
GB 1378240 * 12/1974

* cited by examiner

*Primary Examiner*—Charles E Cooley

(57) ABSTRACT

A baby food maker (100). Baby food maker (100) comprises a jar (102) having an open top and an open bottom for holding food, a top cap (104) for closing the open top of jar (102), a bottom cap (106) sealingly engaged with the lower end of jar (102) for forming a cooking chamber (103), a blending or stirring mechanism (114) installed inside cooking chamber (103) for blending/stirring food, a heating tube (116) fixedly installed on the bottom of bottom cap (106) for heating food, a blender base (112) disposed underneath cooking chamber (103) for supporting cooking chamber (103), a motor (124) installed inside blender base (112) and removably coupled with mechanism (114) for driving mechanism (114) to blend or stir food, and an adapting member (110) engaged with the lower portion of jar (102) for adapting cooking chamber (103) to stand on blender base (112).

17 Claims, 5 Drawing Sheets

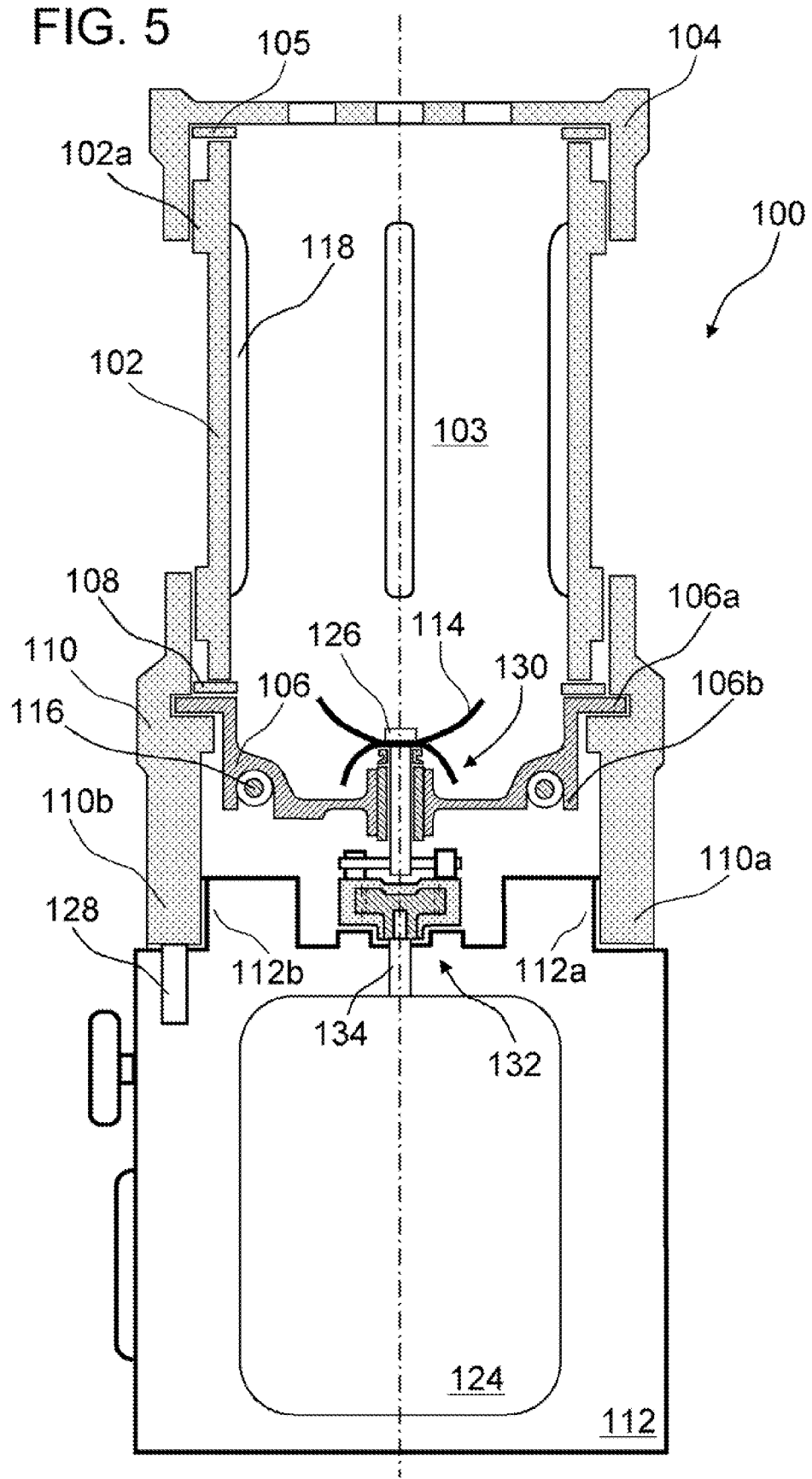

BABY FOOD MAKER

TECHNICAL FIELD AND INDUSTRIAL APPLICABILITY OF THE INVENTION

This invention generally relates to blenders. More specifically, this invention relates to a blender that combines heating and blending for making healthy baby foods and for making healthy foods for children and adults, as well.

BACKGROUND OF THE INVENTION

Baby food is a $1.25 billion a year industry in the United States. Commercial baby foods are popular in the market. New parents spend an average of $300 on baby food during their infant's first year of life. Many parents spend much more. Baby foods are greatly overpriced compared to similar regular foods. Examples include applesauce and fruit juices, as well as diced fruits and vegetables for toddlers. The nutrient content and physical characteristics of those baby foods do not differ significantly from those for adults. However, the baby foods cost up to several times as much per unit weight. Baby foods for which there is no direct comparison in other grocery aisles are also priced very high. Commercial baby foods contain ingredients that are not nutritionally dense. These include: chemically modified food starch (often called Tapioca), flours, sugar, and corn syrup. In addition, commercially available baby food contains about 50% water, which is added during commercial processing.

Therefore, a better way of providing healthy and less expensive baby foods to babies is to make these foods at home. However, consumers lack adequate tools and skills for doing so. Traditionally, people use a blender to blend food after food has been cooked. This two-step process involves labor and skills and it is inconvenient and, sometimes, potentially unsafe to operate.

The very unique aspect of making baby foods is that the quantity of food to be cooked is usually small. Also, baby foods require both heating and blending for proper cooking. Blenders currently on the market are too large for making baby food and they are highly inconvenient for handling and for cleaning after use due to their large size. A smaller version blender is preferred for making baby foods. However, the cleaning after use of a smaller blender is a big issue to deal with due to its small size. On the other hand, how to incorporate heating functionality into a small blender remains a technological challenge, from structural design point of view. Safety for use is a further more important aspect to take care of.

Therefore, it remains desirable to provide a baby food maker that combines blending and heating to make healthy baby foods and to make healthy foods for children and adults, as well, that saves time and efforts, that can handle smaller portion of food more easily, that is safe to use, and that is convenient for cleaning after use, and that saves energy and cost for general public.

BRIEF SUMMARY OF THE INVENTION

Accordingly, the present invention is a baby food maker. This baby food maker comprises a jar having an open top and an open bottom for holding food, a top cap for closing the open top of the jar, a bottom cap sealingly engaged with the tower end of the jar for forming a cooking chamber, blade or stirrer means installed inside the cooking chamber for blending or stirring food, an electrical heating tube fixedly installed on the bottom of the bottom cap for heating food, a blender base disposed underneath the cooking chamber for supporting the cooking chamber, a motor installed inside the blender base and removably coupled with the blade means for driving the blade means, and an adapting member engaged with the lower portion of the jar for adapting the cooking chamber to removably stand on the blender base.

Accordingly, the followings are some of the objects, features, and advantages of the present invention.

It is an object of the present invention to provide a baby food maker for conveniently making healthy baby foods.

It is another object of the present invention to provide a baby food maker that combines heating and blending into one single appliance for making healthy baby foods and for making healthy foods for children and adults, as well.

It is a feature of the present invention that this baby food maker includes a jar having a tubular configuration, which is highly convenient for cleaning after use and dishwasher safe.

It is another feature of the present invention that an electrical heating tube is fixedly installed on the bottom of a cooking chamber, such that the efficiency of heat transfer is high to save time and energy for making baby foods, or creamy soups, or sauces, or dips for adults.

It is a further more feature of the present invention that this baby food maker includes an adapting member for supporting the cooking chamber. The upper end of the adapting member is engaged with the lower portion of the jar and the lower end of the adapting member extends downward to a predetermined distance for adapting the cooking chamber to stand on a blender base for making foods or on a horizontal surface for serving foods.

It is a still further more feature of the present invention that the jar can be adapted into a sealed container for storing leftover food with high sanitary standards.

It is an advantage of the present invention that this baby food maker is highly convenient to use for making baby foods.

It is another advantage of the present invention that this baby food maker can also be used for making many other foods, such as, creamy soups, sauces, and dips for children and for adults, as well.

It is a further more advantage of the present invention that this baby food maker can also be used as a blender for blending cold foods.

Further more features and advantages of the present invention will be readily appreciated, as the same becomes better understood after reading the subsequent description when considered in connection with the non-limiting accompanying drawings.

BRIEF DESCRIPTION OF THE DRAWINGS

FIG. 5 illustrates another cross-sectional view of baby food maker 100.

DETAILED DESCRIPTION OF THE INVENTION

Figure 1:
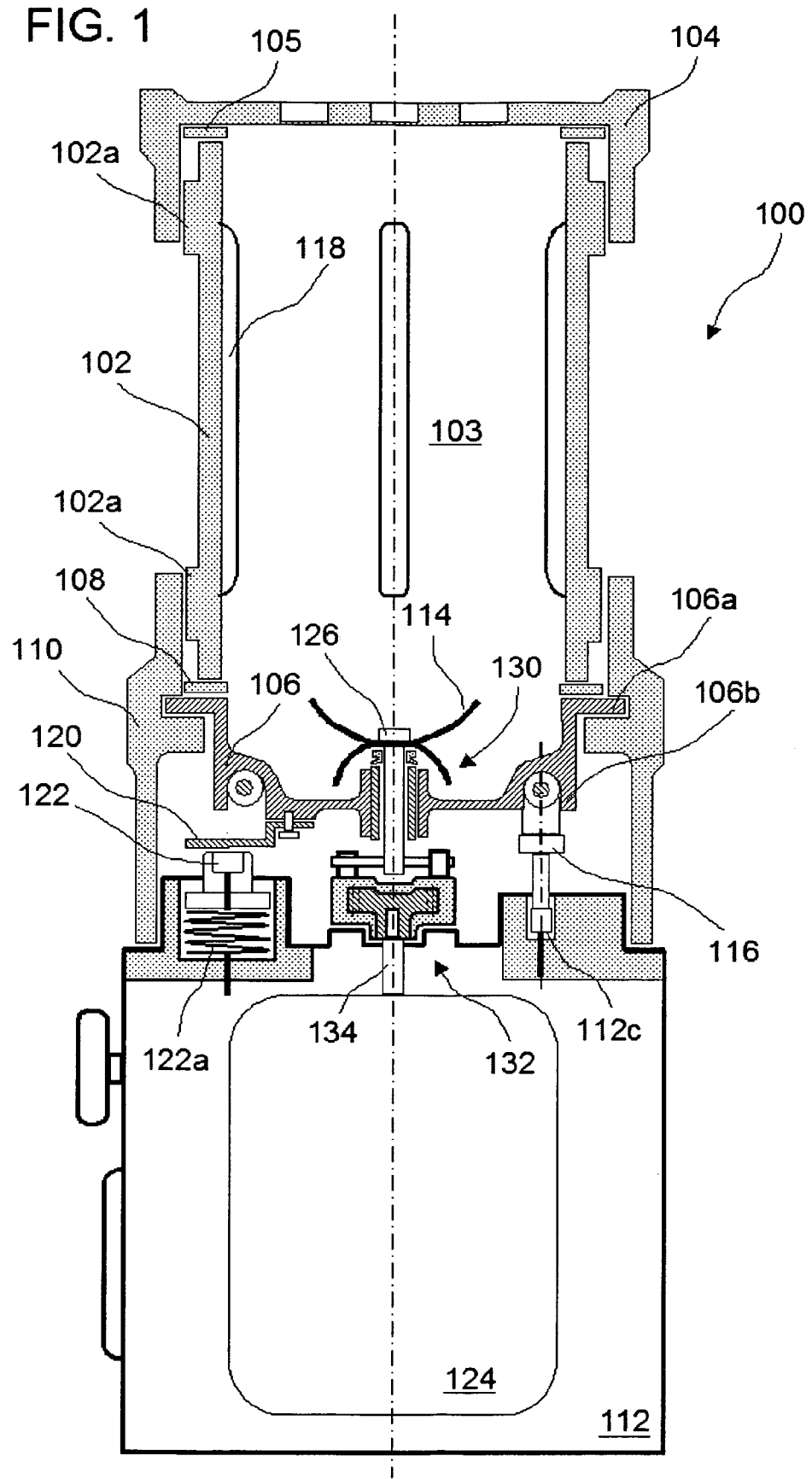
FIG. 1 illustrates a cross-sectional view of an embodiment of the present invention, a baby food maker 100.

Reference is made to FIG. 1, which illustrates a cross-sectional view of an embodiment of the present invention, a baby food maker 100.

Jar 102, having an open top and an open bottom, is provided for holding food. Jar 102 has a generally tubular configuration and is preferably made from a transparent material. Threading 102a is provided on both ends of jar 102 for engaging with other components.

A top cap 104 is provided for closing up the open top of jar 102. Cap 104 engages with the upper portion of jar 102 by means of threading 102a for preventing cap 104 from dropping-off and for preventing food from splashing during blending. A seal ring 106 is provided in between the upper end of jar 102 and the top of cap 104. As cap 104 is tightened onto jar 102, seal ring 105 is squeezed to generate a seal thereof. Some venting slots or holes may be provided on cap 104 for venting steam generated during cooking. A cap 104 with no holes or slots can be provided, as an accessory, for totally seating off the open top of jar 102, such that jar 102 is adapted to be used as a cup for serving food, after being used for cooking or processing food. In this application, jar 102 and cap 104 are preferably made from a material that is microwave-safe; such that a user can reheat food in a microwave oven using the cup formed by jar 102 and cap 104. Another cap 104 with no holes or slots can be provided, as an accessory, for totally sealing off the open bottom of jar 102, such that jar 102 is adapted to be used as a enclosed container for storing food meeting high sanitary standards. A user can keep this container with food in it in his/her refrigerator for later use.

A bottom cap 106, sealingly engaged with the lower end of jar 102 is provided for closing up the open bottom of jar 102 to form a cooking chamber 103. Bottom cap 106 has a bowl-shaped configuration with the open side facing upward. A flat flange 106a is integrally formed around the open periphery for engaging jar 102. Bottom cap 106 is preferably made from a metal material of high thermal conductivity. A sealing ring 108 is provided in between the lower end of jar 102 and flange 106a for seating off the interface thereof. As jar 102 is tightened toward bottom cap 106, seating ring 108 is squeezed to generate a seat thereof. Other configurations for bottom cap 106 are readily applicable to fulfill its functionality, for examples, a flat one or a reverse bowl-shaped one, as know to those skilled in the art and suggested by this invention disclosure.

An adapting member 110, having a generally hollow cylindrical configuration, is provided for supporting cooking chamber 103. The upper end of adapting member 110 is engaged with the lower portion of jar 102 by means of threading 102a and the tower end of adapting member 110 is extended downward to a predetermined distance, such that cooking chamber 103 is adapted to stand on a blender base 112 for blending or cooking food or on a horizontal countertop or dinning table for serving food. Bottom cap 106 is supported inside adapting member 110 fixedly or removably, around flange 106a. Adapting member 110 is also provided for enclosing the space underneath the bottom of bottom cap 106 into a protected space for safety considerations. Some windows or slots (not shown) may be opened on adapting member 110 for venting heat, etc.

A blending blade or a stirrer 114, installed on the bottom of bottom cap 106 and extended into cooking chamber 103, is provided for blending or stirring food disposed inside cooking chamber 103. Blade 114 is adapted to rotate at high speeds, erg., over 8,000 rpm, for blending food. When rotating at lower speeds, e.g., below 2,000 rpm, blade 114 serves as a stirrer for generating food movement within cooking chamber 103 to facilitate heat transfer and uniform heating of food. Blade 114 can be adapted to conform the bottom of bottom cap 106 when used as a stirrer rotating at an even lower speed, e.g., below 200 rpm.

An electrical heating tube 116, having a generally circular configuration, is provided for heating food disposed inside cooking chamber 103. Heating tube 116 is fixedly installed on the outside surface of the bottom of bottom cap 106, inserted into a groove 106b formed on the bottom, and disposed substantially close to the periphery of the bottom. The upper portion of groove 106b is preferably disposed at a vertical position above the bottom of bottom cap 106 to save some vertical space below the bottom that is required for installing heating tube 116. This design feature would also increase the heating surface inside cooking chamber 103, such that heat transfer from heating tube 116 to food is enhanced. The two electrical terminals of heating tube 116 extend downward to a predetermined distance and are adapted to removably engage with an electrical power supply, as cooking chamber 103 is installed in position on blender base 112.

There are significant advantages of installing heating tube 116 directly on the bottom of cooking chamber 103. These advantages include saving a significant amount of material for building a full heater that has a thermal diffusion plate, resulting in space and cost saving and higher heat transfer efficiency, etc. A predetermined protrusion of heating tube 116 upward into the inner space of cooking chamber 103 would further enhance heat transfer from heating tube 116 into food disposed inside cooking chamber 103 and reduce the vertical dimension required for installing heating tube 116 below the bottom of bottom cap 106.

A plurality of co-rotation prevention members 118 is integrally constructed inside jar 102, on the sidewall, for preventing food pieces from co-rotating with blade 114, as blade 114 rotates. Members 118 include an elongated member, preferably, rib-shaped, that extends generally vertical along the sidewall of jar 102. The upper ends of members 118 extend substantially to the upper portion of jar 102. Members 118 extend inward to a predetermined distance, away from the sidewall of jar 102. The predetermined distance is determined based on the size of jar 102. Member 118 also acts as a deflector for deflecting liquid flow directions for facilitating blending of food when baby food maker 100 is used for blending food.

A thermo plate 120, made from a metal material of high thermal conductivity, is fixedly installed on the bottom of bottom cap 106, at a location substantially dose to heating tube 116, for removably engaging with a thermostat 122. Thermostat 122 is installed on top of blender base 112 and is engaged with thermo plate 120 for detecting the temperature of the bottom of bottom cap 106, as cooking chamber 103 is installed in position on blender base 112. Such temperature is used to control the electrical power to heating tube 116. The upper end of thermostat 122 protrudes upward above the upper surface of blender base 112 with pre-loading, e.g., biased via a spring member 122a. Thermostat 122 can also be installed on a bracket that is biased by spring member 122a. Thermostat 122 can be a digital sensor, such as a NTC or PTC, or an adjustable thermostat, or simply a temperature switch, as known to those skilled in the art.

Blender base 112, disposed underneath cooking chamber 103, is provided for supporting cooking chamber 103. The upper portion of blender base 112 is removably engaged with the periphery of the lower portion of adapting member 110 for lockably holding cooking chamber 103 in position.

A motor 124 is installed inside blender base 112 for providing rotation power to blade 114. Motor 124 is removably coupled with a drive shaft 126, as cooking chamber 103 is installed in position on blender base 112, and the upper end of shaft 126 is engaged with blade 114.

Figure 2:
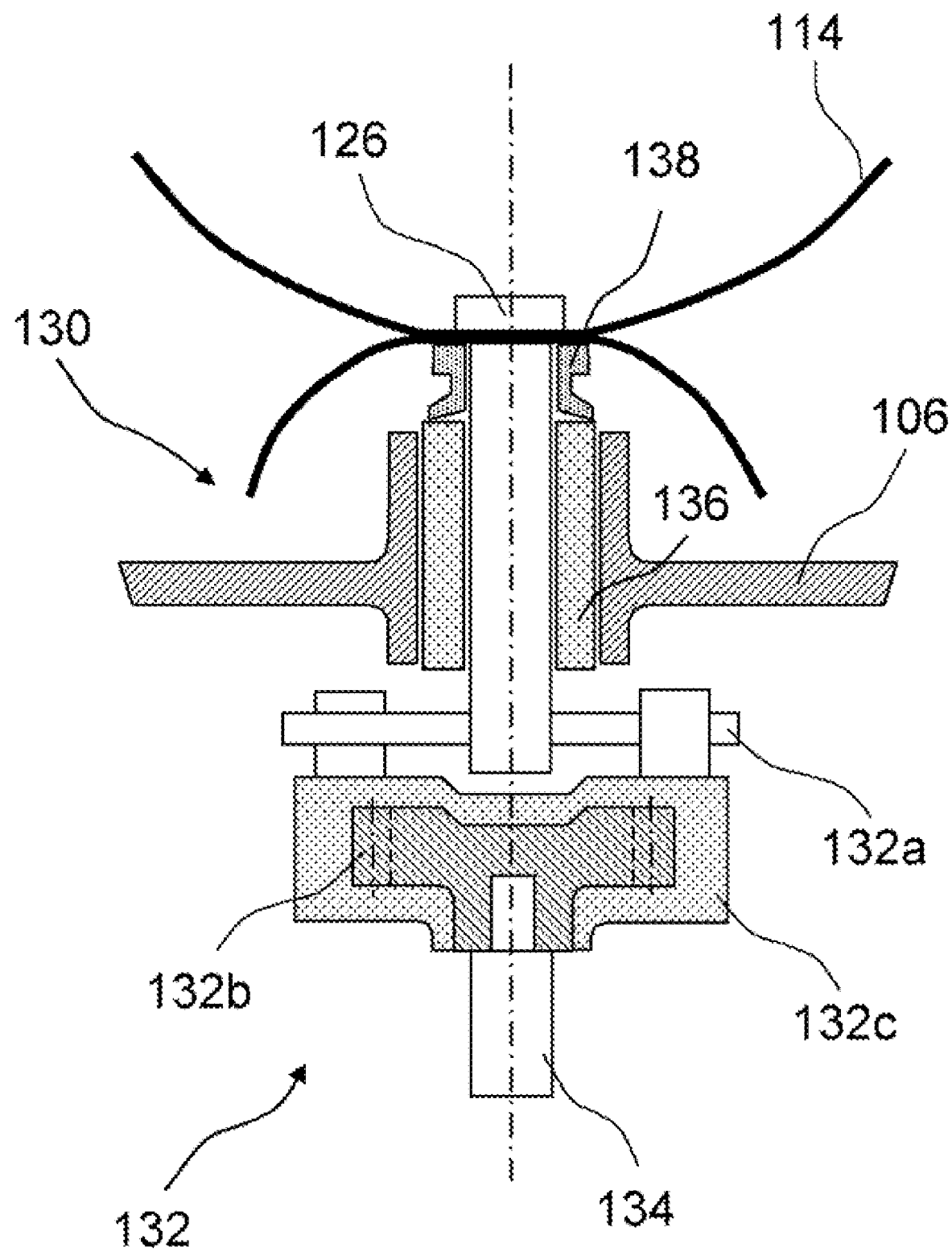
FIG. 2 illustrates an exploded cross-sectional view of seal device 130 and coupling device 132.

FIG. 2 illustrates an exploded cross-sectional view of a seal device 130 and a coupling device 132. Seal device 130, provided for seat off the interface between shaft 126 and the bottom of bottom cap 106, comprises a bushing member 136 and a seal ring 138. Coupling device 132 includes an upper coupling element 132a, which is engaged with the lower end of shaft 126, and a lower coupling element 132b, which is engaged with a motor shaft 134. A thermal insulation material 132c is provided in between element 132a and element 132b for preventing heat from transferring from element 132a to motor shaft 134 through coupling device 132, such that heat transferred from the bottom of bottom cap 106 is prevented from passing through to motor 124 through motor shaft 134.

Bushing 136 is co-axial to shaft 126 and is fixedly and sealingly engaged with the bottom of bottom cap 106. Ring 138 is installed on drive shaft 126 and disposed in between blade 114 and bushing 136. Ring 138 is adapted to be seatingly engaged with shaft 126 and bushing 136 to seal off the interface thereof, The clearance between bushing 136 and shaft 126 is minimized for ideal sealing performance, However, shaft 126 should be able to rotate with minimal friction resistance, which requires high precision of the fitting surfaces thereof, Materials for ring 138 are extremely important when selecting the proper seal for an application, Basic requirements include heat resistance, abrasion resistance, elasticity, etc.

Figure 3:
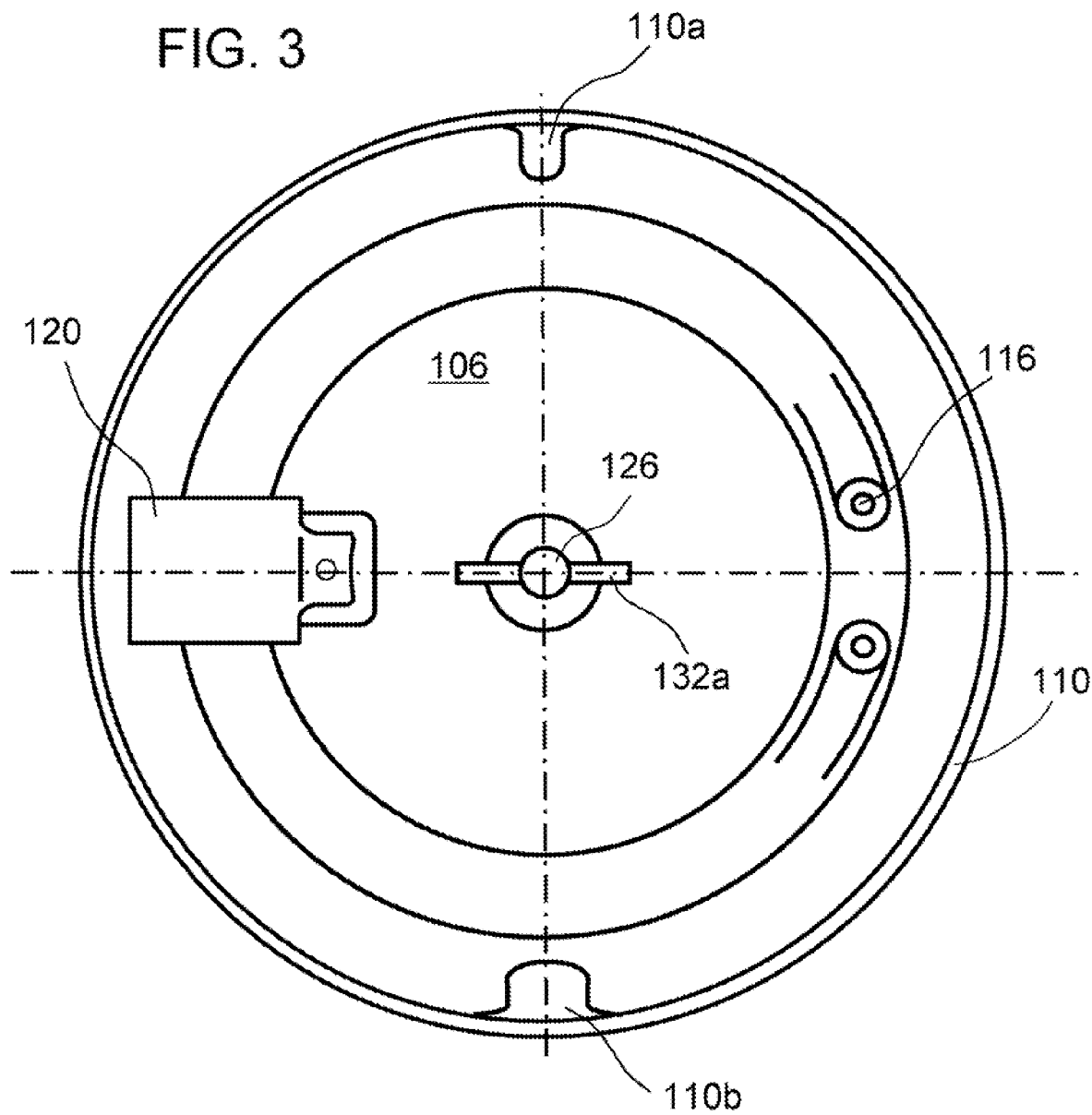
FIG. 3 illustrates a bottom view of bottom cap 106.

FIG. 3 illustrates a bottom view of bottom cap 106 to depict the general layout of various components disposed on the bottom. Two position guides, generally designated as 101a and 110b, protrude inward a predetermined distance from the inner surface of adapting member 110 for guiding cooking chamber 103 in position on blender base 112.

Figure 4:
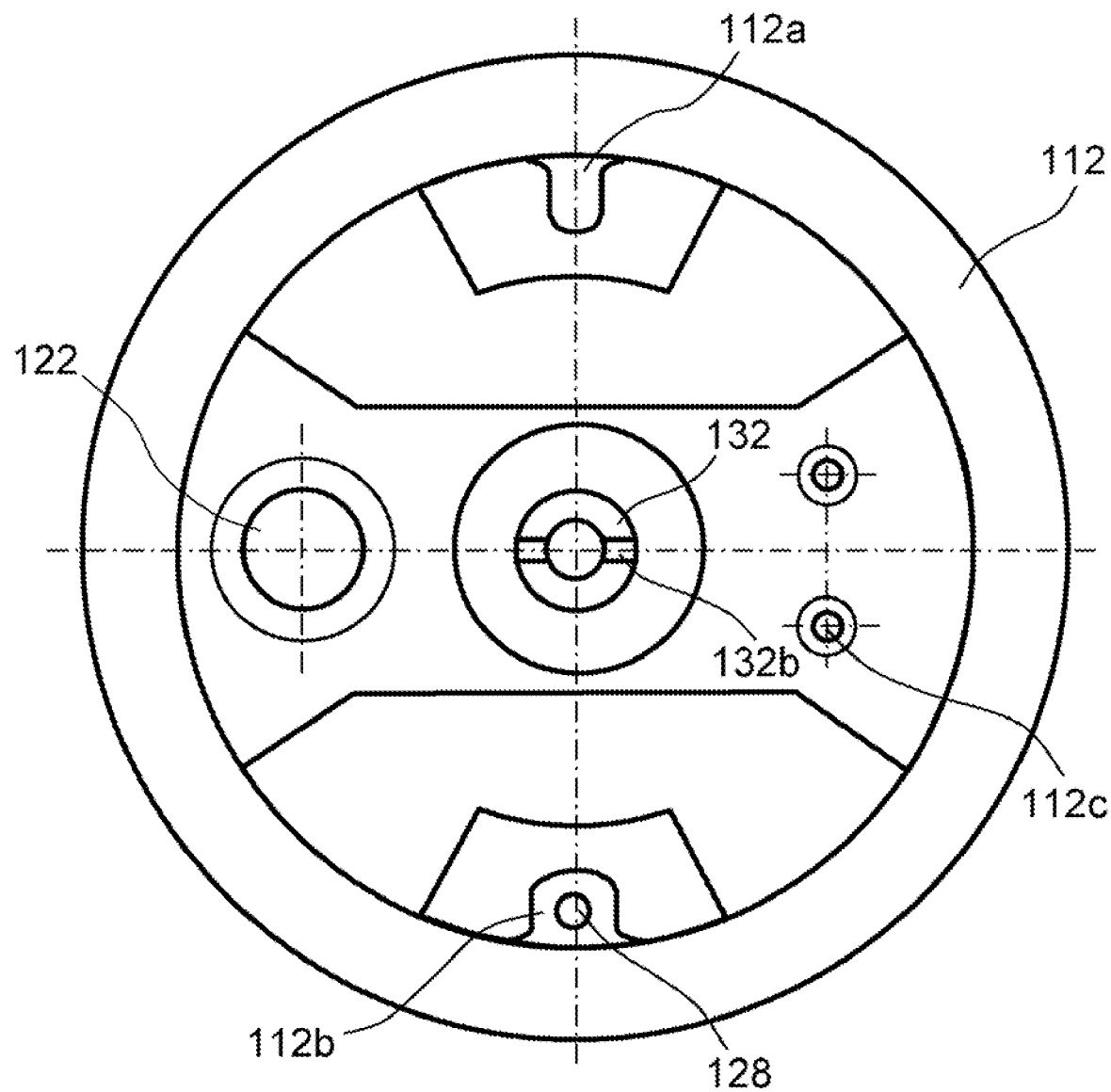
FIG. 4 illustrates a top view of blender base 112.

FIG. 4 illustrates a top view of blender base 112 to depict the general layout of various components disposed on the top of blender base 112. Two base guides, generally designated as 112a and 112b, are provided for removably receiving position guides 110a and 110b, respectively. Electrical port 112c is provided on top of blender base 112 for removably receiving the electrical terminals from heating tube 116, such that electrical power from blender base 112 is provided to heating tube 116, as cooking chamber 103 is installed in position on blender base 112.

An in-position detector 128 is installed on blender base 112 for detecting whether cooking chamber 103 is properly installed or not. Detector 128 is disposed at the bottom of base guide 112b. The upper end of detector 128 protrudes a predetermined distance above the bottom of guide 112b, such that when cooking chamber 103 is installed in position on blender base 112 the lower end of position guide 110b would press with a force on detector 128 to confirm that cooking chamber 103 is well positioned.

FIG. 5 illustrates another cross-sectional view of baby food maker 100 to better describe how cooking chamber 103 is installed on blender base 112. Position guides 110a and 110b are inserted into base guides 112a and 112b, respectively, such that cooking chamber 103 is removably locked in position on blender base 112, limiting the rotation of cooking chamber 103 with respect to blender base 112.

Accordingly, as cooking chamber 103 is property installed in position on blender base 112, motor 124 is coupled with shaft 126, thermostat 122 is engaged with thermo plate 120, or directly with the bottom of bottom cap 106, the electrical terminals of heating tube 116 are connected with electrical port 112c, and detector 128 is depressed to confirm that cooking chamber 103 is well in position.

Accordingly, readers will see that this baby food maker can be used to cook and blend food to make baby foods, or creamy soups, or sauces, or dips, for children and adults, as wets. The tubular design of the jar makes the baby food maker highly convenient for cleaning after use and dishwasher safe. The jar can be adapted into a cup for serving food and can also be adapted into a sealed container for storing food with high sanitary standards. An attached electrical heating tube is highly efficient in heating food, thereby saving time and energy to consumers. An adapting member is engaged with the jar and the bottom cap to form a sealed cooking chamber, such that the cooking chamber is removable for cleaning after use and dishwasher safe.

The present invention has been described in an illustrative manner, it is to be understood that the terminology, which has been used, is intended to be in the nature of words of description rather than of limitation.

Although this invention has been described in its preferred forms and structures with a certain degree of particularity, these should not be construed as limiting the scope of the invention but as merely providing illustrations of some of the presently preferred embodiments of this invention.

Thus it is understood that the present disclosure of the preferred forms can be changed in the details of construction and in the combination and arrangement of parts without departing from the spirit and the scope of the invention as hereinafter claimed.

What is claimed is:

1. A baby food maker, said baby food maker comprising:
   a jar having an open top and an open bottom for holding food;
   a top cap for closing up the open top of said jar;
   a bottom cap sealingly engaged with the open bottom of said jar for forming a cooking chamber;
   blade means installed on said bottom cap and extended into said cooking chamber for blending or stirring food;
   heating means fixedly installed on the bottom of said bottom cap for heating food;
   a blender base disposed underneath said cooking chamber for supporting said cooking chamber;
   a motor installed inside said blender base for driving said blade means;
   an adapting member for supporting said cooking chamber and for adapting said cooking chamber to stand on said blender base;
   wherein the lower portion of said jar is engaged with the upper portion of said adapting member by means of threading;
   wherein said bottom cap is supported inside said adapting member;
   a thermostat installed on or inside said blender base for detecting and limiting the temperature of said bottom cap and wherein said thermostat allows said bottom cap to be detachable therefrom; and
   a seal member installed in between the lower end of said jar and a rim that laterally extends from said bottom cap for sealing off the interface thereof and as said jar is tightened onto said adapting member by means of threading said seal member is squeezed to form a seal between the lower end of said jar and said rim that laterally extends from said bottom cap.

2. A baby food maker as defined in claim 1, wherein said jar is made from a transparent material.

3. A baby food maker as defined in claim 1, wherein said adapting member has a generally annular shell configuration and wherein said bottom cap is fixedly supported inside said adapting member.

4. A baby food maker as defined in claim 1, wherein said heating means includes a heating tube of a circular configuration, said heating tube is fixedly installed on the bottom of said bottom cap, and said heating tube is disposed substantially close to the periphery of the bottom of said bottom cap.

5. A baby food maker as defined in claim 4, wherein said heating tube is disposed at a vertical position, such that the upper side of said heating tube protrudes upward a predetermined distance above the bottom of said bottom cap, wherein the space below the bottom of said bottom cap required for installing said heating tube is reduced,. and whereby the total height of said baby food maker is reduced, resulting in less cost for manufacturing and shipping said baby food maker.

6. A baby food maker as defined in claim 1, wherein said thermostat is preloaded with a spring member, the upper end of said thermostat protrudes upward above the upper surface of said blender base, and when said cooking chamber is disposed in position on said blender base said thermostat is adapted to be engaged with the bottom of said bottom cap.

7. A baby food maker as defined in claim 1, wherein said thermostat is preloaded with a spring member, a thermo plate is fixedly installed on the bottom of said bottom cap at a location substantially close to said heating means, the upper end of said thermostat protrudes upward above the upper surface of said blender base, and when said cooking chamber is disposed in position on said blender base said thermostat is adapted to be engaged with said thermo plate.

8. A baby food maker as defined in claim 1, wherein said bottom cap includes a sealing device for sealing off the interface between said drive shaft and the bottom of said bottom cap, said sealing device includes a bushing member fixedly and sealingly engaged with a central aperture opened on the bottom of said bottom cap, and said drive shaft is threaded through said bushing member.

9. A baby food maker as defined in claim 8, wherein said seal device includes a sealing ring installed on said drive shaft and disposed in between said blade means and said bushing member and said sealing ring is adapted to be sealingly engaged with said drive shaft and said bushing member for sealing off the interface thereof.

10. A baby food maker as defined in claim 1, wherein said adapting member includes at least one position guide for guiding said cooking chamber in position on said blender base, said blender base includes at least one base guide for removably receiving said at least one position guide from said adapting member, such that said cooking chamber is guided in position on said blender base and the rotation of said cooking chamber with respect to said blender base is limited.

11. A baby food maker, said baby food maker comprising:
a jar having an open top and an open bottom for holding food;
a top cap for closing up the open top of said jar;
a bottom cap sealingly engaged with the open bottom of said jar for forming a cooking chamber;
blade means installed on said bottom cap and extended into said cooking chamber for blending or stirring food;
heating means fixedly installed on the bottom of said bottom cap for heating food;
a blender base disposed underneath said cooking chamber for supporting said cooking chamber;
a motor installed inside said blender base for driving said blade means;
an adapting member for supporting said cooking chamber and for adapting said cooking chamber to stand on said blender base;
wherein said jar is engaged with said adapting member by means of threading;
a thermostat installed on or inside said blender base for operationally detecting and limiting the temperature of said bottom cap; and
wherein said thermostat allows said bottom cap to be detachable therefrom.

12. A baby food maker as defined in claim 11, wherein said thermostat is preloaded with a spring member, the upper end of said thermostat protrudes generally upward, and when said cooking chamber is disposed in position on said blender base said thermostat is adapted to be operationally engaged with the bottom of said bottom cap.

13. A baby food maker as defined in claim 11, wherein said thermostat is preloaded with a spring member, a thermo plate is fixedly installed on the bottom of said bottom cap at a location substantially close to said heating means, the upper end of said thermostat protrudes generally upward, and when said cooking chamber is disposed in position on said blender base said thermostat is adapted to be engaged with said thermo plate.

14. A baby food maker as defined in claim 11, wherein said bottom cap is installed inside said adapting member, a seal member is installed in between the lower end of said jar and a rim that extends laterally from said bottom cap for sealing off the interface thereof, and as said jar is tightened onto said adapting member by means of threading said seal member is squeezed to form a seal thereof.

15. A cooking apparatus that combines blending and heating for cooking food, said cooking apparatus comprising:
a jar having an open top and an open bottom for holding food;
a lid for closing up the open top of said jar;
a heated bottom sealingly engaged with the open bottom of said jar for forming a cooking chamber;
blade means installed on said heated bottom and extended into said cooking chamber for blending or stirring food;
a base disposed underneath said cooking chamber for supporting said cooking chamber;
a motor installed inside said base for driving said blade means;
an adapting member for supporting said cooking chamber and for adapting said cooking chamber to stand on said base;
wherein said jar is engaged with said adapting member by means of threading;
a thermostat installed on or inside said base for operationally detecting and limiting the temperature of said heated bottom; and
wherein said thermostat allows said heated bottom to be detachable therefrom.

16. A cooking apparatus as defined in claim 15, wherein said thermostat is preloaded with a spring member, the upper end of said thermostat protrudes generally upward, and when said cooking chamber is disposed in position on said base said thermostat is adapted to be operationally engaged with said heated bottom.

17. A cooking apparatus as defined in claim 15, wherein said heated bottom is installed inside said adapting member, a seal member is installed in between the bottom of said jar and a rim that laterally extends from said heated bottom for sealing off the interface thereof, and as said jar is tightened onto said adapting member by means of threading said seal member is squeezed to form a seal thereof.

* * * * *